United States Patent

[11] 3,592,233

[72] Inventor George V. Woodling
 22077 West Lake Road, Rocky River, Ohio 44116
[21] Appl. No. 880,677
[22] Filed Nov. 28, 1969
[45] Patented July 13, 1971

[54] COMMON BEARING MEANS FOR LOAD SHAFT AND ROTARY VALVE IN FLUID PRESSURE DEVICE
7 Claims, 4 Drawing Figs.

[52] U.S. Cl. .................................................. 137/625.21, 418/61
[51] Int. Cl. ............................................ F16k 11/02
[50] Field of Search ........................................... 418/61; 64/9, 31; 74/15.8, 63, 86; 137/625.21, 625.22, 625.15, 625.31, 625.46, 625.47, 630.21, 637.3, DIG. 5; 251/88, 188, 192, 208, 292, 304, 309

[56] References Cited
UNITED STATES PATENTS
| | | | |
|---|---|---|---|
| 3,381,498 | 5/1968 | McDermott | 64/31 X |
| 3,405,603 | 10/1968 | Woodling | 418/61 |
| 3,531,226 | 9/1970 | Woodling | 137/625.61 X |

Primary Examiner—M. Cary Nelson
Assistant Examiner—Robert J. Miller
Attorney—Woodland, Krost, Granger and Rust ABSTRACT: Common bearing means are provided for a load shaft and a rotary valve in a fluid pressure device. The load shaft and rotary valve are mounted in two separate compartments of a housing. A hollow drive shaft extension is carried by the load shaft in one compartment and extends into the other compartment upon which the rotary valve is mounted. The common bearing means directly supports the load shaft and indirectly supports the rotary valve through the hollow drive shaft extension. The common bearing means preferably comprises a pair of tapered roller bearings which provide both radial and axial thrust. The rotary valve is radially spaced from the housing in which it is mounted and makes an axially slidable connection with the hollow drive shaft extension and thus is not affected by radial and axial movements of the load shaft.

PATENTED JUL 13 1971    3,592,233

INVENTOR.
GEORGE V. WOODLING
BY
Woodling, Krost, Granger and Rust.
attys.

COMMON BEARING MEANS FOR LOAD SHAFT AND ROTARY VALVE IN FLUID PRESSURE DEVICE

BACKGROUND OF THE INVENTION

The fluid pressure device is of the type embodying a stator-rotor mechanism and includes a load shaft and a rotary valve. The load shaft is connected to the stator-rotor mechanism by an actuating (wobble) shaft extending through the rotary valve. The flow of fluid to and from the stator-rotor mechanism is controlled by the rotary valve which rotates relative to a stationary valve. In the prior art, the rotary valve was rotatively mounted on bearing means directly supporting same. This type of direct bearing mounting usually entailed an extra amount of machining and assembly time, plus the fact that the machining required close tolerances which is expensive to maintain. One advantage claimed for a direct bearing mounting of the rotary valve is that the valve is not affected by radial and axial load thrusts on the load shaft.

Accordingly, it is an object of my invention to mount the rotary valve on the same bearings that support the load shaft and still not be affected by the radial and axial load thrusts on the load shaft.

Another object is to mount the rotary valve on a drive shaft extension carried by the load shaft, whereby the load shaft and the rotary valve are mounted on common bearing means.

Another object is to provide an axially slidable connection between the rotary valve and the drive shaft extension to accommodate for axial movement of the load shaft and to provide a radial clearance between the rotary valve and the housing in which it is mounted, whereby radial movement of the load shaft does not affect the operation of the rotary valve.

Another object of the invention is to provide for common bearing means for the load shaft and the rotary valve without interfering with the operation of the rotary valve.

Another object is the provision of bearing means for directly supporting the load shaft and for indirectly supporting the rotary valve.

SUMMARY OF THE INVENTION

The invention constitutes common bearing means in a fluid pressure device comprising, housing means including generally first compartment means and second compartment means, load shaft means in said first compartment means, rotary valve means in said second compartment means, extension drive means carried by said load shaft means for rotating said rotary valve means by said load shaft means, said extension drive means axially extending from said load shaft means and having terminal portion means projecting into said second compartment means, said rotary valve means and said terminal portion means having an axially slidable connection therebetween to accommodate for axial movement of said load shaft means, said rotary valve means and said second compartment means having a radial clearance therebetween to accommodate for radial movement of said load shaft means, said common bearing means directly supporting said load shaft means in said first compartment means and indirectly supporting said rotary valve means in said second compartment means.

Other objects and a fuller understanding of this invention may be had by referring to the following description and claims, taken in conjunction with the accompanying drawings, in which:

Figure 2:
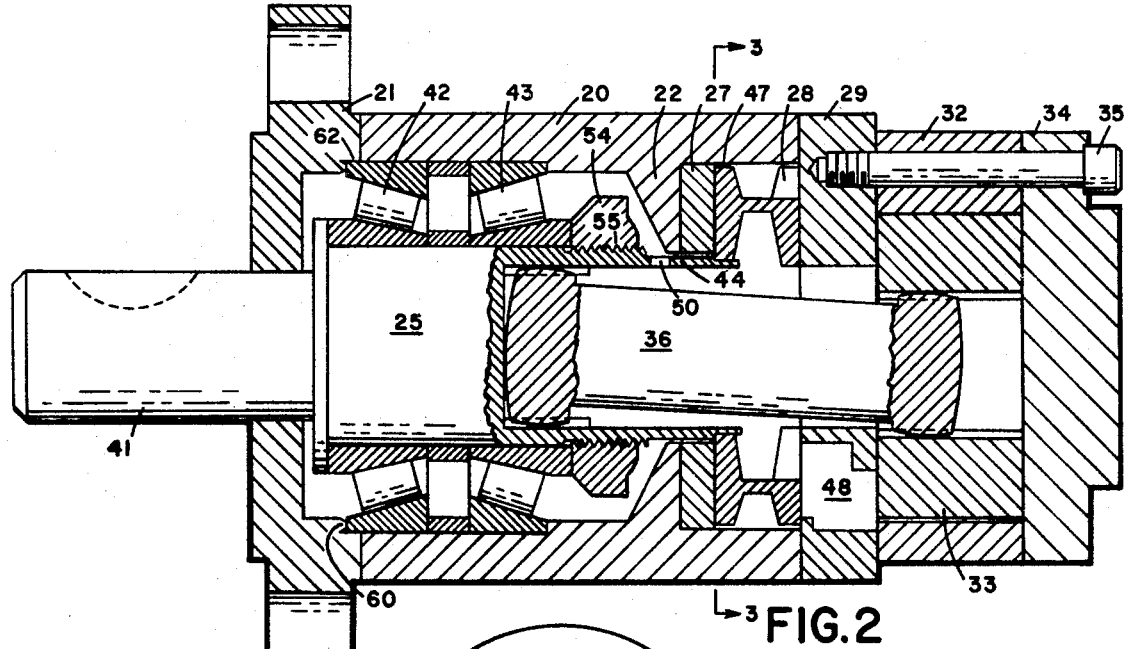
FIG. 2 is a longitudinal sectional view of FIG. 1, except that the section through the rotary valve is taken along a line other than a vertical centerline, and showing a section illustrating both the outside and inside rotary valve ports which appear unshaded.
Figures 3, 4:
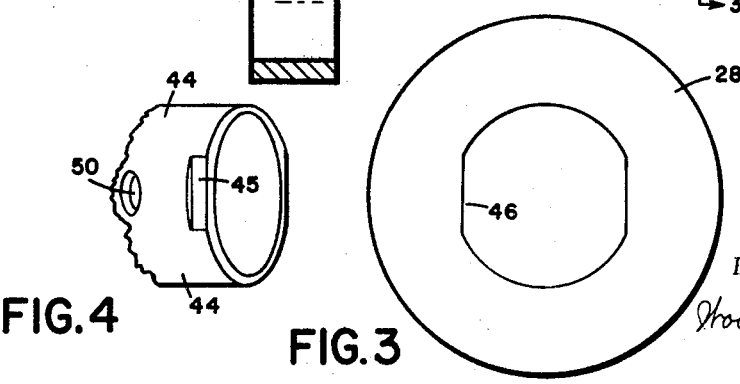

FIG. 3 is a left-hand side view of the rotary valve only, taken along the line 3-3 of FIG. 2, showing principally a female socket of noncircular configuration, the rotary valve being rotated 90° from the position shown in FIG. 2; and FIG. 4 is a representation of a male shank provided on a terminal portion of a hollow shaft adapted to slidably fit within the female socket of the rotary valve, the male shank being rotated 90° from the position shown in FIG. 2 to match the angular position of the female socket in FIG. 3.

For clarity of invention, the usual static seals and the seal for the rotating shaft are not shown. Also, all wear parts are made of hardenable surfaces and are well lubricated by the operating fluid.

Figure 1:
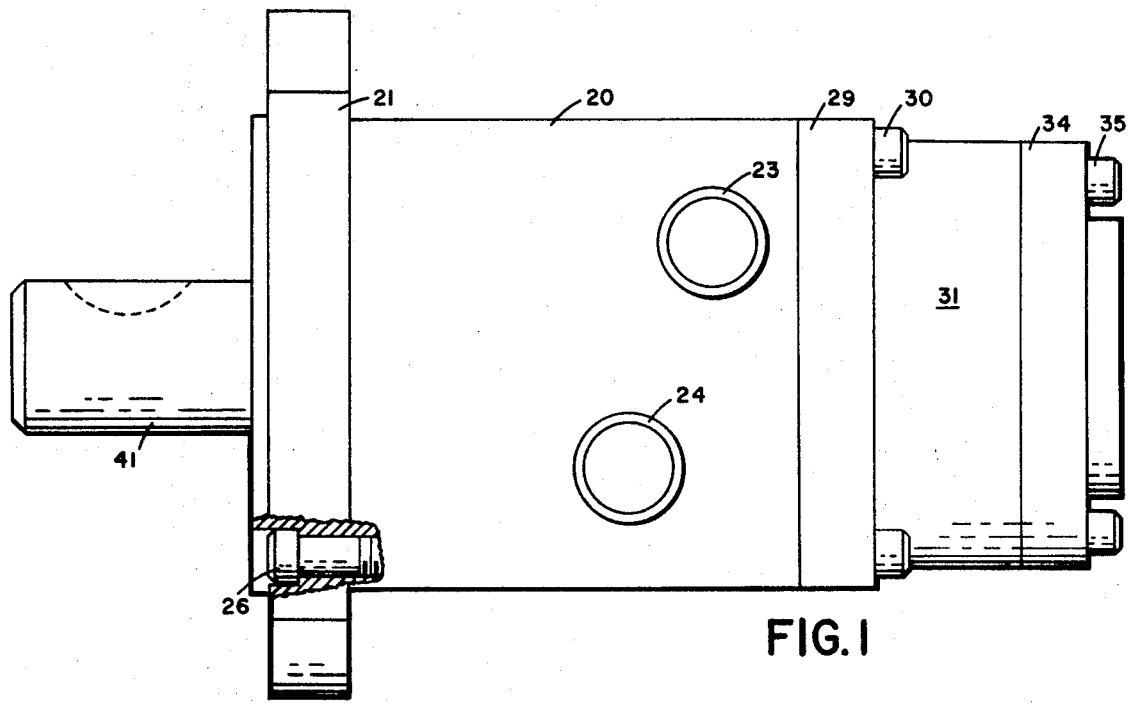
FIG. 1 is a top view of a fluid pressure device embodying the features of my invention.

With reference to the drawing, the fluid pressure device in which my common bearing means may be incorporated, comprises generally a main housing 20 having substantially a square cross section. A mounting flange 21 may be secured to the left-hand end of the housing by means of suitable screws 26 (one of which is shown in FIG. 1). The housing 20 is hollow from end to end, and intermediate the ends of the hollow housing there is provided an annular internal rim 22 which generally separates the hollow housing into a left-hand end compartment and a right-hand end compartment. Rotatively mounted in the left-hand end compartment is a main load shaft 25 having an axis substantially coinciding with the longitudinal axis of the fluid pressure device. A bushing 27 and a rotary valve 28 are mounted in the right-hand end compartment. On the right-hand end of the hollow housing, there is mounted a square stationary valve member 29 by means of suitable screws 30. The rotary valve is adapted to be rotated relative to the stationary valve member 29 for controlling the entrance of fluid to and the exit of fluid from a stator-rotor mechanism 31 comprising a stator 32 and a rotor 33. An end cap 34 encloses the stator-rotor mechanism 31. The stator-rotor mechanism 31 and the end cap 34 are secured to the stationary valve member 29 by means of screws 35. Fluid is delivered to and from the housing 20 through a pair of fluid ports 23 and 24. An actuating shaft 36 interconnects the main shaft 25 with rotor 33 of the stator-rotor mechanism 31 and is adapted to transmit torque therebetween.

The main shaft 25 comprises an enlarged internal portion having a reduced external portion 41 extending axially outwardly of the main housing 20 through the mounting flange 21. The enlarged internal portion of the main shaft is supported preferably by tapered roller bearings 42 and 43 disposed side by side with the bearing 42 disposed oppositely to that of the tapered roller bearing 43. Thus, the tapered roller bearings 42 and 43, in combination with each other, provide for radial thrust as well as for end thrust in both axial directions, with the tapered roller bearing 42 disposed to take the greater part of the radial load. A tightening nut 54 which threadably engages male threads 55 secures the bearings 42 and 43 against axial movement upon the main shaft. The tightening nut 54 may be provided with a built-in locking feature to prevent loosening.

As shown, the bearings 42 and 43 are secured against axial movement in the housing by axial fixation means, indicated by the reference character 60. The axial fixation means 60 is located within a bore 62 of the flange and comprises an annular V-shaped or pointed rib which axially abuts against a transversely disposed solid abutment wall of the bearing 42. The rib may be constructed either integrally with or as a separate part from the flange 21. By pressing the flange 21 against the end of the housing 20 during assembly, the pointed rib is coined against the bearing 42, with the result that the fixation means accommodates for axial tolerance in matching the position of the bearings in the housing. The pressure required to coin the axial fixation means is greater than the endwise thrust load to which the bearing means 42 may be subjected in operation, in which case the bearings 42 and 43 are resisted against axial movement in operation. The main shaft is entirely supported by the two tapered roller bearings 42 and 43. The reduced external shaft portion 41 where it passes axially through the end mounting flange 21 is not journaled therein but rotates therein with a small radial clearance which is adapted to be sealed off by suitable shaft seal means, not shown. The axial fixation means 60, after being coined, provides a fluid seal between the housing and the flange.

The bearings 42 and 43 constitute common bearing means for the main shaft 25 and the rotary valve 28. The common bearing means directly support the main shaft 25 and indirectly support the rotary valve 28 through extension drive means comprising a hollow shaft 44 carried by the load shaft 25. The hollow shaft 44 extends axially from the load shaft 25 in the left-hand compartment into the right-hand compartment for driving connection with the rotary valve 28 for rotating same relative to the stationary valve 29. The hollow shaft 44 terminated with a male shank 45 which slidably fits within a female socket 46 provided in the rotary valve 28, see FIGS. 2, 3 and 4. This connection comprises a nonrotatable connection and rotates the rotary valve upon rotation by the main shaft. The connection also provides slidable axial movement between the rotary valve 28 and the hollow shaft 40 to accommodate for axial movement of the load shaft without interfering with the operation of the rotary valve. The axial slidable movement which is permitted between the male shank 45 and the female socket 46 is greater than the maximum distance that the load shaft 25 may move in an axial direction during operation. As illustrated in FIG. 2, the rotary valve 28 and the second compartment means in which it is mounted has a radial clearance 47 therebetween to accommodate for radial movement of the load shaft 25 without interfering with the operation of the rotary valve. The radial clearance 47 is greater than the maximum distance that the load shaft 25 may move in a radial direction during operation.

The operation of the rotary valve relative to the stationary valve provides for controlling the entrance of fluid to and the exit of fluid from the stator-rotor mechanism. The action of the rotary valve 28 in commutation with the stationary valve is such that there is a first series of commutating fluid connections between the fluid port 23 and the stator-rotor mechanism and a second series of commutating fluid connections between the stator-rotor mechanism and the fluid port 24. The stationary valve 29 has a plurality of circumferentially disposed openings 48 which extend therethrough to provide for fluid communication between the rotary valve 28 and the stator-rotor mechanism. The commutating valve action, and the flow of fluid between the fluid ports 23 and 24 and the stator-rotor mechanism is substantially the same as that shown and described in my U.S. Pat. No. 3,405,603. Thus, in the present application, the annular channel around the outside of the rotary valve is in constant communication with the fluid port 23 and the central space inside the rotary valve is in constant communication with the fluid port 24 through opening means 50 in the hollow shaft 44. Likewise, the section through the rotary valve in FIG. 2 of the present application is taken along a line substantially the same as the line 23-24 of my patent.

As shown and described in the present invention, the rotary valve 28 functions without interference from axial and radial thrust loads on the load shaft 25, even though it is rotatively supported by the same bearings that support the load shaft.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What I claim is:

1. Common bearing means in a fluid pressure device comprising, housing means including generally first compartment means and second compartment means, load shaft means in said first compartment means rotary valve means in said second compartment means, extension drive means carried by said load shaft means for rotating said rotary valve means by said load shaft means, said extension drive means axially extending from said load shaft means and having terminal portion means projecting into said second compartment means, said rotary valve means and said terminal portion means having an axially slidable connection therebetween to accommodate for axial movement of said load shaft means, said rotary valve means and said second compartment means having a radial clearance therebetween to accommodate for radial movement of said load shaft means, said common bearing means directly supporting said load shaft means in said first compartment means and indirectly supporting said rotary valve means in said second compartment means.

2. The structure of claim 1, wherein said extension drive means comprises hollow shaft means.

3. The structure of claim 2, wherein said hollow shaft means constitutes sole radial support means for said rotary valve means in said second compartment means.

4. The structure of claim 1, wherein said common bearing means comprises at least a pair of tapered roller bearings.

5. The structure of claim 2, including stationary valve means enclosing said rotary valve means in said second compartment means, wall means disposed between said first and second compartment means, said rotary valve means being confined between said wall means and said stationary valve means in an axial direction and being supported solely by said hollow shaft in a radial direction.

6. The structure of claim 2, wherein said rotary valve means has female socket means and wherein said hollow shaft in said second compartment means has terminal male shank means, said socket means and said shank means comprising axially slidable interfitting parts and constituting a nonrotative connection.

7. The structure of claim 6, wherein said wall means has a central opening and wherein said hollow shaft means extends through said central opening.